(12) United States Patent
Cariou

(10) Patent No.: US 9,923,619 B2
(45) Date of Patent: Mar. 20, 2018

(54) TECHNIQUES FOR PASSIVE BEAMFORMING TRAINING

(71) Applicant: INTEL CORPORATION, Santa Clara, CA (US)

(72) Inventor: Laurent Cariou, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/977,551

(22) Filed: Dec. 21, 2015

(65) Prior Publication Data

US 2017/0180025 A1 Jun. 22, 2017

(51) Int. Cl.
*H04B 7/06* (2006.01)
*H04W 52/04* (2009.01)

(52) U.S. Cl.
CPC .......... *H04B 7/0617* (2013.01); *H04W 52/04* (2013.01)

(58) Field of Classification Search
CPC .............................. H04B 7/0617; H04W 52/04
See application file for complete search history.

(56) References Cited

U.S. PATENT DOCUMENTS

| | | | | |
|---|---|---|---|---|
| 2004/0224637 A1* | 11/2004 | Silva | ........................ | H04B 7/04 455/63.4 |
| 2007/0099669 A1* | 5/2007 | Sadri | ................. | H04W 72/0453 455/562.1 |
| 2010/0157955 A1* | 6/2010 | Liu | ................... | H04W 72/0446 370/336 |
| 2010/0214169 A1* | 8/2010 | Kafle | ....................... | H01Q 3/26 342/368 |
| 2013/0301551 A1* | 11/2013 | Ghosh | ................. | H04W 72/042 370/329 |
| 2014/0029461 A1* | 1/2014 | Kinamon | ............. | H04B 7/0857 370/252 |
| 2015/0289147 A1* | 10/2015 | Lou | ...................... | H04B 7/0408 370/329 |
| 2016/0044711 A1* | 2/2016 | Lou | ................... | H04W 74/0816 370/338 |
| 2016/0119043 A1* | 4/2016 | Rajagopal | .............. | H04B 7/063 370/329 |
| 2016/0149633 A1* | 5/2016 | Sanderovich | ......... | G01S 5/0289 375/267 |
| 2016/0157828 A1* | 6/2016 | Sumi | .................. | G01N 29/0654 702/189 |
| 2016/0277087 A1* | 9/2016 | Jo | ........................ | H04B 7/0617 |

* cited by examiner

*Primary Examiner* — Kenneth Lam

(57) ABSTRACT

Techniques for passive beamforming training are described. In one embodiment, for example, an apparatus may comprise at least one memory and logic to implement a station (STA), at least a portion of the logic comprised in circuitry coupled to the at least one memory, the logic to decode a medium access control (MAC) header of a beamforming frame associated with a beamforming training procedure, determine whether the beamforming frame is addressed to the STA, and in response to a determination that the beamforming frame is not addressed to the STA, identify a second STA based on a source identifier comprised in the MAC header, the second STA to comprise a source STA of the beamforming frame, and determine one or more beamforming parameters associated with the second STA based on one or more training fields comprised in the beamforming frame. Other embodiments are described and claimed.

22 Claims, 12 Drawing Sheets

*100*

100

*300*

TECHNIQUES FOR PASSIVE BEAMFORMING TRAINING

TECHNICAL FIELD

Embodiments described herein generally relate to wireless communications between devices in wireless networks.

BACKGROUND

In order to identify transmit and receive antenna configurations that will optimize the link qualities of beamformed wireless links between them, two wireless communication devices may perform a beamforming training procedure. Such a beamforming training procedure may generally involve the exchange of one or more beamforming frames. By exchanging such beamforming frames, the two participating devices may be able to identify best transmit and receive sectors via which to wirelessly communicate with each other. If a third wireless communication device is located within sufficient proximity, it may be able to overhear some or all of the beamforming frames exchanged between the two participating devices.

DETAILED DESCRIPTION

Figure 1:
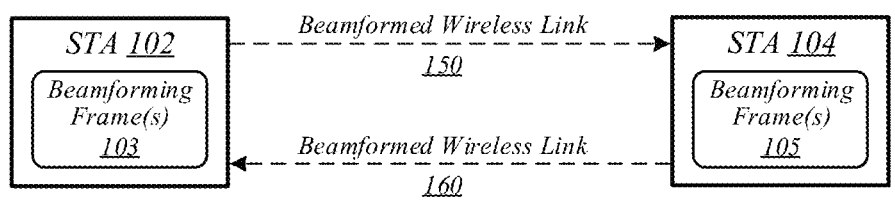
FIG. 1 illustrates an embodiment of a first operating environment.

Various embodiments may be generally directed to techniques for passive beamforming training. In one embodiment, for example, an apparatus may comprise at least one memory and logic to implement a station (STA), at least a portion of the logic comprised in circuitry coupled to the at least one memory, the logic to decode a medium access control (MAC) header of a beamforming frame associated with a beamforming training procedure, determine whether the beamforming frame is addressed to the STA, and in response to a determination that the beamforming frame is not addressed to the STA, identify a second STA based on a source identifier comprised in the MAC header, the second STA to comprise a source STA of the beamforming frame, and determine one or more beamforming parameters associated with the second STA based on one or more training fields comprised in the beamforming frame. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless communications between devices in wireless networks. Various embodiments may involve wireless communications performed according to one or more wireless communications standards. Some embodiments may involve wireless communications performed according to one or more wireless local area network (WLAN) communication standards published by the Institute of Electrical and Electronics Engineers (IEEE). For example, some embodiments may involve wireless communications performed according to one or more protocols and/or procedures defined in the IEEE 802.11ad-2012 standard published Dec. 28, 2012 ("the IEEE 802.11ad-2012 standard") and/or one or more predecessors, revisions, progeny, and/or variants thereof. Various embodiments may involve wireless communications performed according to one or more "next-generation" 60 GHz ("NG60") wireless local area network (WLAN) communications standards, such as the IEEE 802.11ay standard that is currently under development. The embodiments are not limited to these examples.

Some embodiments may additionally or alternatively involve wireless communications performed according to one or more other IEEE WLAN communication standards. For example, various embodiments may additionally or alternatively involve wireless communications performed according to one or more protocols and/or procedures defined in the IEEE 802.11-2012 standard published Mar. 29, 2012 ("the IEEE 802.11-2012 standard"). Additional examples of IEEE WLAN communication standards that may be used in some embodiments may include—without limitation—one or more IEEE 802.11a, IEEE 802.11b, IEEE 802.11g, IEEE 802.11n, IEEE 802.11u, IEEE 802.11ac, IEEE 802.11af, IEEE 802.11ah, and/or IEEE 802.11ax standards, including their predecessors, revisions, progeny, and/or variants.

Various embodiments may additionally or alternatively involve wireless communications performed according to one or more broadband wireless communication standards. For example, various embodiments may involve wireless communications performed according to one or more 3rd Generation Partnership Project (3GPP), 3GPP Long Term Evolution (LTE), 3GPP LTE-Advanced (LTE-A), and/or LTE-A Plus technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communication technologies and/or standards that may be used in some embodiments may include High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) and/or machine-to-machine (M2M) standards, and/or near-field communication (NFC) standards such as standards developed by the NFC Forum, including any predecessors, revisions, progeny, and/or variants of any of the above. The embodiments are not limited to these examples.

FIG. 1 illustrates an operating environment 100 that may be representative of some embodiments. In operating environment 100, stations (STAs) 102 and 104 communicate with each other over beamformed wireless links 150 and 160. STA 102 sends data to STA 104 over beamformed wireless link 150, and receives data from STA 104 via beamformed wireless link 160. Likewise, STA 104 sends data to STA 102 over beamformed wireless link 160, and receives data from STA 102 via beamformed wireless link 150.

In some embodiments, STAs 102 and 104 may possess directional transmission and reception capabilities, and the exchange of communications over beamformed wireless links 150 and 160 may involve directional transmission and reception. Each directional transmission may generally comprise a transmission that is beamformed in such a way as to be directed towards a selected transmit sector. Likewise, each directional reception may generally comprise a reception that is realized using antenna settings optimized for receiving incoming transmissions from a selected receive sector. In various embodiments, the link qualities of beamformed wireless links 150 and 160 may depend significantly on the transmit sectors selected for transmission and the receive sectors selected for reception.

In various embodiments, in order to identify transmit sectors and receive sectors for selection to optimize the link qualities of beamformed wireless links 150 and 160 of FIG. 1, STAs 102 and 104 may perform a beamforming training procedure. In some embodiments, according to the beamforming training procedure, STAs 102 and 104 may exchange one or more beamforming frames. In various embodiments, STA 102 may transmit one or more beamforming frames 103 to STA 104. In some embodiments, STA 104 may transmit one or more beamforming frames 105 to STA 102. In various embodiments, exchanging beamforming frames 103 and 105 may enable STAs 102 and 104 to identify best transmit and receive sectors via which to wirelessly communicate over beamformed wireless links 150 and 160. The embodiments are not limited in this context.

Figure 2:
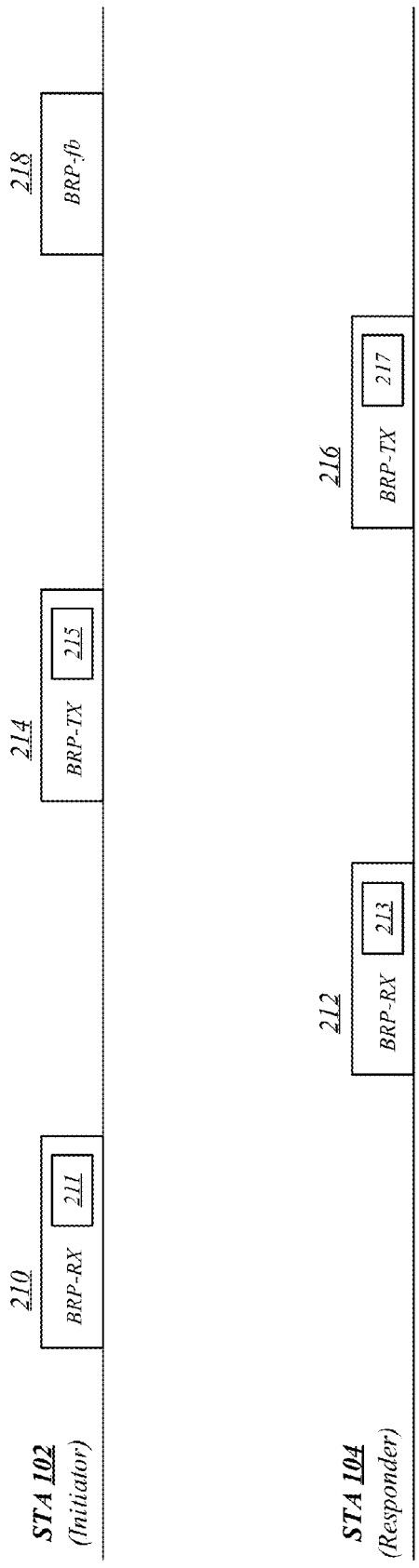
FIG. 2 illustrates an embodiment of a communications flow.

FIG. 2 illustrates a communications flow 200 that may be representative of a beamforming training procedure according to which STAs 102 and 104 of FIG. 1 may exchange beamforming frames in order to train beamformed wireless links 150 and 160. More particularly, communications flow 200 may be representative of a beam refinement procedure according to some embodiments. In this example, STA 102 may comprise an initiator of the beam refinement procedure, and STA 104 may comprise a responder of the beam refinement procedure. The embodiments are not limited in this context.

As shown in FIG. 2, according to communications flow 200, STA 102 may transmit a beam refinement protocol (BRP)-RX frame 210 to STA 104. In various embodiments, BRP-RX frame 210 may include a series of training fields 211. In some embodiments, training fields 211 may comprise receive training (TRN-R) training fields. In various embodiments, STA 102 may transmit training fields 211 omni-directionally or quasi-omni-directionally. In some embodiments, STA 104 may receive training fields 211 directionally. In various embodiments, STA 104 may vary its active receive sector over the course of the series of training fields 211. In some embodiments, over the course of the series of training fields 211, via each of a plurality of receive sectors, STA 104 may receive a respective training field 211 and measure a signal quality with which it receives that training field 211 via that receive sector. In various embodiments, STA 104 may identify a receive sector via which it receives a training field 211 with a highest level of signal quality as its best receive sector with respect to reception from STA 102. The embodiments are not limited in this context.

In some embodiments, STA 104 may transmit a BRP-RX frame 212 to STA 102. In various embodiments, BRP-RX frame 212 may include a series of training fields 213. In some embodiments, training fields 213 may comprise TRN-R training fields. In various embodiments, STA 104 may transmit training fields 213 omni-directionally or quasi-omni-directionally. In some embodiments, STA 102 may receive training fields 213 directionally. In various embodiments, STA 102 may vary its active receive sector over the course of the series of training fields 213. In some embodiments, over the course of the series of training fields 213, via each of a plurality of receive sectors, STA 102 may receive a respective training field 213 and measure a signal quality with which it receives that training field 213 via that receive sector. In various embodiments, STA 102 may identify a receive sector via which it receives a training field 213 with a highest level of signal quality as its best receive sector with respect to reception from STA 104. The embodiments are not limited in this context.

In some embodiments, STA 102 may transmit a BRP-TX frame 214 to STA 104. In various embodiments, BRP-TX frame 214 may comprise a series of training fields 215. In some embodiments, training fields 215 may comprise transmit training (TRN-T) training fields. In various embodiments, STA 102 may transmit training fields 215 directionally. In some embodiments, STA 102 may vary its active transmit sector over the course of the series of training fields 215. In various embodiments, over the course of the series of training fields 215, via each of a plurality of transmit sectors, STA 102 may transmit a respective training field, and STA 104 may measure a signal quality with which it receives that training field. The embodiments are not limited in this context.

In some embodiments, STA 104 may transmit a BRP-RX frame 216 to STA 102. In various embodiments, STA 104 may include within BRP-RX frame 216 an identifier for a best transmit sector of STA 102. In some embodiments, the best transmit sector may comprise a transmit sector via which STA 104 received a training field 215 with a highest level of signal quality during the transmission of BRP-TX frame 214 by STA 102. In various embodiments, BRP-RX frame 216 may comprise a series of training fields 217. In some embodiments, training fields 217 may comprise TRN-T training fields. In various embodiments, STA 104 may transmit training fields 217 directionally. In some embodiments, STA 104 may vary its active transmit sector over the course of the series of training fields 217. In various embodiments, over the course of the series of training fields 217, via each of a plurality of transmit sectors, STA 104 may transmit a respective training field, and STA 102 may measure a signal quality with which it receives that training field. The embodiments are not limited in this context.

In some embodiments, STA 102 may transmit a BRP feedback (BRP-fb) frame 218 to STA 104. In various embodiments, STA 102 may include within BRP-fb frame 218 an identifier for a best transmit sector of STA 104. In some embodiments, the best transmit sector may comprise a transmit sector via which STA 102 received a training field 217 with a highest level of signal quality during the transmission of BRP-TX frame 216 by STA 104. The embodiments are not limited in this context.

Figure 3:
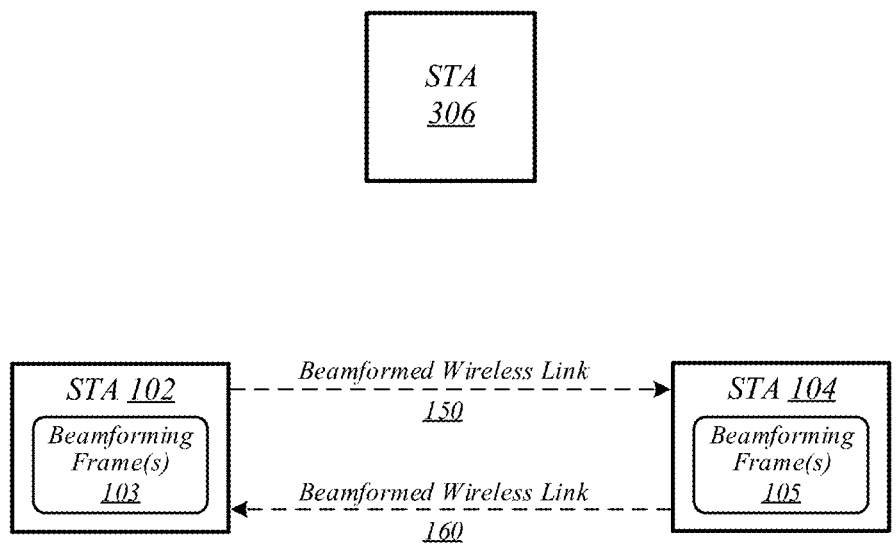
FIG. 3 illustrates an embodiment of second operating environment.

FIG. 3 illustrates an operating environment 300 that may be representative of various embodiments. In operating environment 300, a STA 306 is located within relatively close proximity to STAs 102 and 104. In some embodiments, by virtue of its proximity to STAs 102 and 104, STA 306 may be able to overhear some or all of the wireless communications between STAs 102 and 104. It is to be appreciated that in various other embodiments, STA 306 may be positioned at a location at which it can overhear some or all transmissions of STA 102 but not those of STA 104, or a location at which it can overhear some or all transmissions of STA 104 but not those of STA 102. The embodiments are not limited in this context.

In some embodiments, at its position in operating environment 300, STA 306 may be able to overhear one or more beamforming frames 103 that STA 102 transmits to STA 104. In various embodiments, STA 306 may additionally or alternatively be able to overhear one or more beamforming frames 105 that STA 104 transmits to STA 102. In some embodiments, overhearing a given beamforming frame may generally involve successfully receiving that beamforming frame at a STA that is not an intended recipient of that beamforming frame. According to conventional techniques, a STA such as STA 306 may be configured to simply ignore beamforming frames that it may overhear.

Disclosed herein are techniques for passive beamforming training. According to various such techniques, a STA such as STA 306 may be configured with the ability to perform passive beamforming training based on beamforming frames that it may overhear. In some embodiments, performing passive beamforming training based on one or more beamforming frames transmitted by a source STA may generally comprise determining one or more beamforming parameters associated with the source STA based on those one or more beamforming frames. A STA performing passive beamforming training may be referred to as a "third-party" STA. In various embodiments, a third-party STA may perform passive beamforming training to identify its preferred receive sector for prospective reception from a source STA. In some embodiments, a third-party STA may perform passive beamforming training to identify a preferred transmit sector of a source STA with respect to prospective reception by the third-party STA from the source STA. In various embodiments, a third-party STA may perform passive beamforming training to estimate an interference that would be incident upon a source STA as a result of a prospective omni-directional or quasi-omni-directional transmission by the third-party STA. In some embodiments, a third-party STA may perform passive beamforming training to estimate an interference that would be incident upon a source STA as a result of a prospective directional transmission by the third-party STA towards a given transmit sector of the third-party STA. The embodiments are not limited to these examples.

Figure 4:
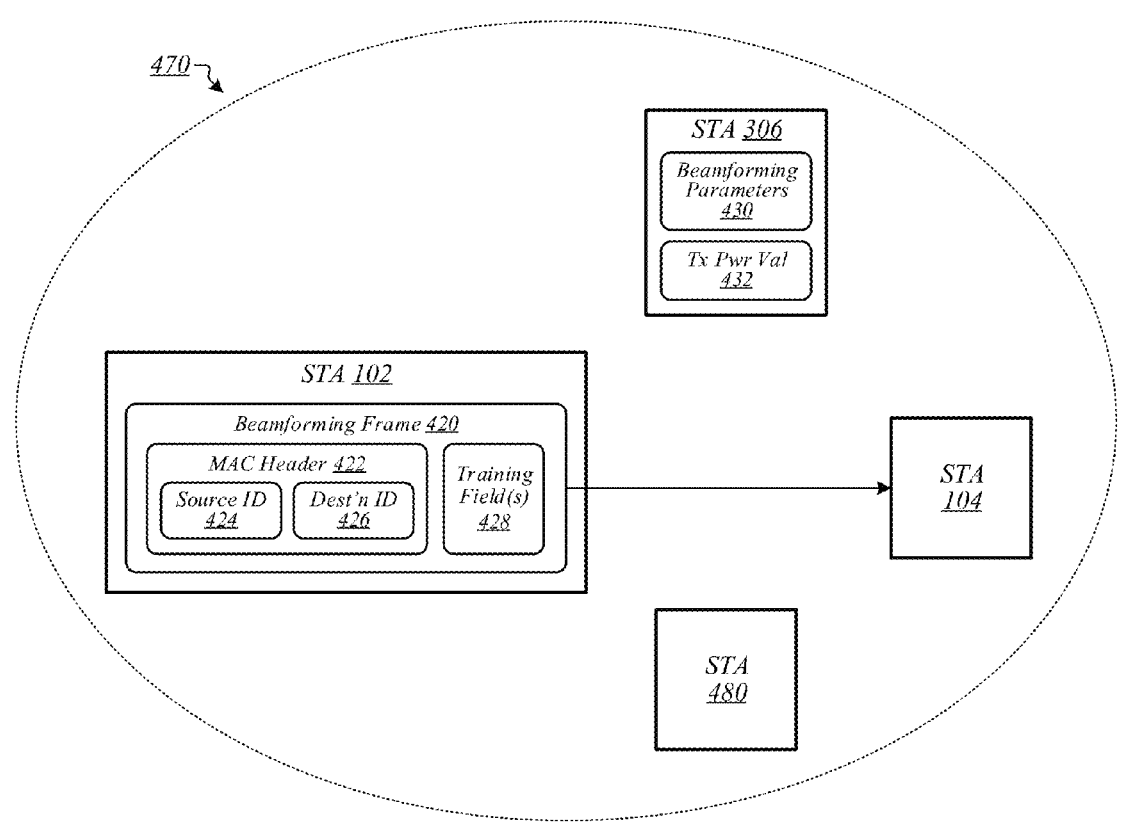
FIG. 4 illustrates an embodiment of third operating environment.

FIG. 4 illustrates an operating environment 400 that may be representative of one in which one or more of the disclosed passive beamforming training techniques may be implemented according to various embodiments. In operating environment 400, during a beamforming training procedure in which STAs 102 and 104 engage in order to train the wireless links between them, STA 102 may transmit a beamforming frame 420 to STA 104. In this context, as it is the STA that transmits beamforming frame 420, STA 102 may be referred to as the source STA with respect to beamforming frame 420. As intended recipient of beamforming frame 420, STA 104 may be referred to as the destination STA with respect to beamforming frame 420. In some embodiments, STA 102 may comprise an initiator of the beamforming training procedure, and STA 104 may comprise a responder of the beamforming training procedure. In various other embodiments, STA 102 may comprise the responder of the beamforming training procedure, and STA 104 may comprise the initiator of the beamforming training procedure. In some embodiments, the beamforming training procedure may comprise a beam refinement procedure. In various embodiments, beamforming frame 420 may comprise a beam refinement frame. In some embodiments, beamforming frame 420 may comprise a BRP-TX frame. In various embodiments, beamforming frame 420 may comprise a BRP-RX frame. The embodiments are not limited in this context.

In some embodiments, beamforming frame 420 may comprise a MAC header 422. In various embodiments, MAC header 422 may comprise a source identifier 424 and a destination identifier 426. In some embodiments, source identifier 424 may generally comprise an identifier associated with the source STA of beamforming frame 420. In this example, since STA 102 comprises the source STA of beamforming frame 420, source identifier 424 may comprise an identifier associated with STA 102. In various embodiments, source identifier 424 may comprise a MAC address of STA 102. In some embodiments, source identifier 424 may be comprised in a transmitter address (TA) or source address (SA) field of MAC header 422. In various embodiments, destination identifier 426 may generally comprise an identifier associated with the destination STA of beamforming frame 420. In this example, since STA 104 comprises the destination STA of beamforming frame 420, destination identifier 426 may comprise an identifier associated with STA 104. In some embodiments, destination identifier 426 may comprise a MAC address of STA 104. In various embodiments, destination identifier 426 may be comprised in a receiver address (RA) or destination address (DA) field of MAC header 422. The embodiments are not limited in this context.

In some embodiments, beamforming frame 420 may comprise one or more training fields 428. In various embodiments, the one or more training fields 428 may generally comprise fields intended for receive sector training. For example, in some embodiments, beamforming frame 420 may comprise a BRP-RX frame and the one or more training fields 428 may comprise TRN-R fields. In various other embodiments, the one or more training fields 428 may generally comprise fields intended for transmit sector training. For example, in some embodiments, beamforming frame 420 may comprise a BRP-TX frame and the one or more training fields 428 may comprise TRN-T fields. In various embodiments, STA 102 may transmit the one or more training fields 428 omni-directionally or quasi-omni-directionally. In some other embodiments, STA 102 may transmit the one or more training fields 428 directionally. In various such embodiments, beamforming frame 420 may comprise a series of training fields 428, and STA 102 may vary its active transmit sector over the course of the series of training fields 428. The embodiments are not limited in this context.

In some embodiments, STA 306 may be located within sufficient proximity to STA 102 to successfully receive beamforming frame 420. In various embodiments, STA 306 may decode MAC header 422 and identify the source STA of beamforming frame 420 based on source identifier 424. In the example of operating environment 400, STA 306 may identify STA 102 as the source STA of beamforming frame 420 based on source identifier 424, which may comprise a MAC address of STA 102. In some embodiments, STA 306 may determine that it is not the intended recipient of beamforming frame 420 based on destination identifier 426. More particularly, STA 306 may determine that it is not the intended recipient of beamforming frame 420 based on a determination that destination identifier 426 comprises an identifier associated with a different STA than STA 306. In the example of operating environment 400, destination identifier 426 may comprise a MAC address of STA 104, and STA 306 may determine that it is not the intended recipient of beamforming frame 420 based on a determination that a MAC address of STA 306 does not match that comprised in destination identifier 426. The embodiments are not limited in this context.

In various embodiments, STA 306 may be configured with the ability to perform passive beamforming training based on beamforming frames that it may overhear. In some embodiments, in response to a determination that beamforming frame 420 is not addressed to STA 306—and thus that beamforming frame 420 constitutes an overheard beamforming frame—STA 306 may opt to perform passive beamforming training based on beamforming frame 420. In various embodiments, in conjunction with such passive beamforming training, STA 306 may identify STA 102 as the source STA of beamforming frame 420. In some such embodiments, STA 306 may identify STA 102 as the source STA of beamforming frame 420 based on source identifier 424. The embodiments are not limited in this context.

In various embodiments, STAs 102, 104, and 306 may each be associated with a same personal basic service set (PBSS) 470. In some embodiments, in order to enable prospective passive beamformers in PBSS 470 to understand the contents of the beamforming frames that they may overhear, wireless communications in PBSS 470 may be conducted using a control PHY in omni-directional or quasi-omni-directional mode. In various embodiments, a PBSS control point/access point (PCP/AP) of PBSS 470 may transmit a trigger frame that schedules all BRP frame transmissions for a given time interval and specifies parameters associated with such BRP frames. In some such embodiments, a target transmit time of such a trigger frame may be transmitted in one or more beacons, and may be disseminated to each of the various STAs that may be located in PBSS 470, to enable those STAs to perform receive beamforming towards the PCP/AP. In various other embodiments, directional transmissions of such a trigger frame may be swept through each of the various transmit sectors of the PCP/AP. The embodiments are not limited in this context.

In some embodiments, STA 306 may determine one or more beamforming parameters 430 associated with STA 102 based on one or more training fields 428 comprised in beamforming frame 420. In various embodiments, the one or more beamforming parameters 430 may include one or more beamforming parameters identifying preferred sectors with respect to reception by STA 306 of prospective transmissions of STA 102. For example, in some embodiments, the one or more beamforming parameters 430 may include a receive sector identifier for a preferred receive sector of STA 306 with respect to reception by STA 306 of prospective transmissions of STA 102. In another example, in various embodiments, the one or more beamforming parameters 430 may include a transmit sector identifier for a preferred transmit sector of STA 102 with respect to reception by STA 306 of prospective transmissions of STA 102. The embodiments are not limited to these examples.

In some embodiments, the one or more beamforming parameters 430 may include one or more beamforming parameters generally descriptive of expected effects at/upon STA 102 of prospective transmissions by STA 306. In various embodiments, for example, the one or more beamforming parameters 430 may include one or more beamforming parameters comprising estimates of incident interference at STA 102 that may result from prospective transmissions by STA 306. In some embodiments, STA 306 may estimate any particular such incident interference based on a received power, received quality, signal strength, signal-to-noise ratio (SNR), or other signal quality metric associated with its reception of one or more training fields 428 from 420. In various embodiments, STA 306 may estimate an incident interference at STA 102 that may result from a prospective omni-directional or quasi-omni-directional transmission of STA 306. In some embodiments, STA 306 may estimate an incident interference at STA 102 that may result from a prospective directional transmission of STA 306 towards a particular transmit sector. In various such embodiments, the particular transmit sector may comprise a transmit sector via which STA 306 plans to directionally transmit to another STA within PBSS 470. For example, in some embodiments, STA 306 may plan to directionally transmit to a STA 480 via a particular transmit sector, and may estimate an interference that may be incident upon STA 102 as a result of the planned transmission to STA 480 via that particular transmit sector. The embodiments are not limited to this example.

In various embodiments, STA 306 may be configured to compensate for differences in transmission power when estimating incident interferences that may result from its transmissions. In some embodiments, STA 102 may be configured to communicate a transmit power parameter in conjunction with transmitting beamforming frame 420 in order to enable any given recipient of beamforming frame 420 to determine a power with which beamforming frame 420 was transmitted. In various embodiments, STA 306 may identify a transmit power value 432 based on such a transmit power parameter, where transmit power value 432 comprises the transmit power of beamforming frame 420. In some embodiments, STA 102 may include such a transmit power parameter within beamforming frame 420. In various embodiments, for example, a transmit power parameter indicating a transmit power of beamforming frame 420 may be comprised within a BRP Request field of beamforming frame 420. In some such embodiments, a transmit power (TxPower) field may be defined within the BRP Request field, and the TxPower field may contain the transmit power parameter. In various other embodiments, STA 102 may include such a transmit power parameter within some other field of beamforming frame 420. In yet other embodiments, an indication of the transmit power of beamforming frame 420 may be comprised/signaled within a physical layer convergence protocol (PLCP) header of a PLCP protocol data unit (PPDU) in which beamforming frame 420 is encapsulated. The embodiments are not limited to these examples.

In some embodiments, beamforming frame 420 may be associated with a beam combining subphase of a beamforming training procedure in which STAs 102 and 104 engage in order to train the wireless links between them. In various embodiments, the beam combining subphase may comprise an initiator beam combining (I-BC) subphase. In some embodiments, the beam combining subphase may comprise a responder beam combining (R-BC) subphase. In various embodiments, based on one or more training fields 428 transmitted via a same transmit sector of STA 102, STA 306 may concurrently train multiple ones of its receive sectors. In some embodiments, for example, based on a training field 428 transmitted via a given transmit sector of STA 102, STA 306 may determine a plurality of signal quality metrics associated with that transmit sector of STA 102, where each of plurality of signal quality metrics corresponds to a respective one of a plurality of receive sectors of STA 306. In various such embodiments, each of the plurality of signal quality metrics may comprise an SNR. In some embodiments, by performing such concurrent training of multiple receive sectors based on training fields 428, STA 306 may train all of its receive sectors. In various other embodiments, STA 306 may only train the receive sectors that it is likely to use to communicate with other STAs in PBSS 470. The embodiments are not limited in this context.

In some embodiments, in order to enable prospective passive beamformers in PBSS 470 to perform concurrent passive training of multiple sectors in such fashion, STAs in PBSS 470 may be configured to regularly use beam combining in conjunction with beamforming training. In various embodiments, STAs in PBSS 470 may be configured to perform beamforming training using beam combining according to numbers of receive sectors that are greater than or equal to a threshold number of receive sectors for passive beam combining. In some embodiments, for example, an AP/PCP or cluster coordinator may signal a "minimum Nbeam_Rx for passive beam combining" parameter that identifies such a threshold number. In various embodiments, STA 102 may identify the threshold number of receive sectors for passive beam combining based on the "minimum Nbeam_Rx for passive beam combining" parameter, and may perform beamforming training using beam combining according to a number of receive sectors that is greater than or equal to the threshold number of receive sectors. In some embodiments, in conjunction with a beamforming training procedure with respect to which it comprises the initiator, STA 102 may implement beam combining using a number of receive sectors Nbeam(I,Rx) that is greater than or equal to the threshold number of receive sectors. In various embodiments, in conjunction with a beamforming training procedure with respect to which it comprises the responder, STA 102 may implement beam combining using a number of receive sectors Nbeam(R,Rx) that is greater than or equal to the threshold number of receive sectors. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
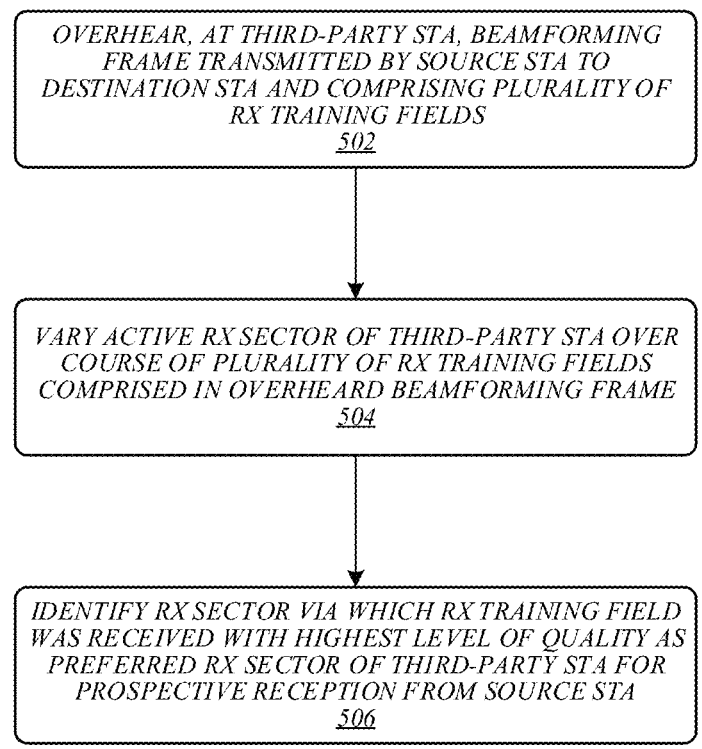
FIG. 5 illustrates an embodiment of a first logic flow.

FIG. 5 illustrates an example of a logic flow 500 that may be representative of operations that may be performed by a STA in conjunction with one or more of the disclosed techniques for passive beamforming training according to some embodiments. For example, logic flow 500 may be representative of operations that may be performed in various embodiments by STA 306 in operating environment 400 of FIG. 4. As shown in FIG. 5, a beamforming frame may be overheard at a third-party STA at 502, the beamforming frame transmitted by a source STA to a destination STA and comprising a plurality of receive (RX) training fields. For example, in operating environment 400 of FIG. 4, STA 306 may overhear beamforming frame 420, which may be transmitted by STA 102 to STA 104 and may contain a plurality of training fields 428 that comprise TRN-R fields. At 504, an active RX sector of the third-party STA may be varied of the course of a plurality of RX training fields comprised in the overheard beamforming frame. For example, in operating environment 400 of FIG. 4, STA 306 may vary its active RX sector over the course of the plurality of training fields 428 in beamforming frame 420. At 506, an RX sector with which an RX training field was received with a highest level of quality may be identified as a preferred RX sector of the third-party STA for prospective reception from the source STA. For example, in operating environment 400 of FIG. 4, STA 306 may identify an RX sector via which it received a training field 428 with a highest SNR as a preferred RX sector for prospective reception from STA 102. The embodiments are not limited to these examples.

Figure 6:
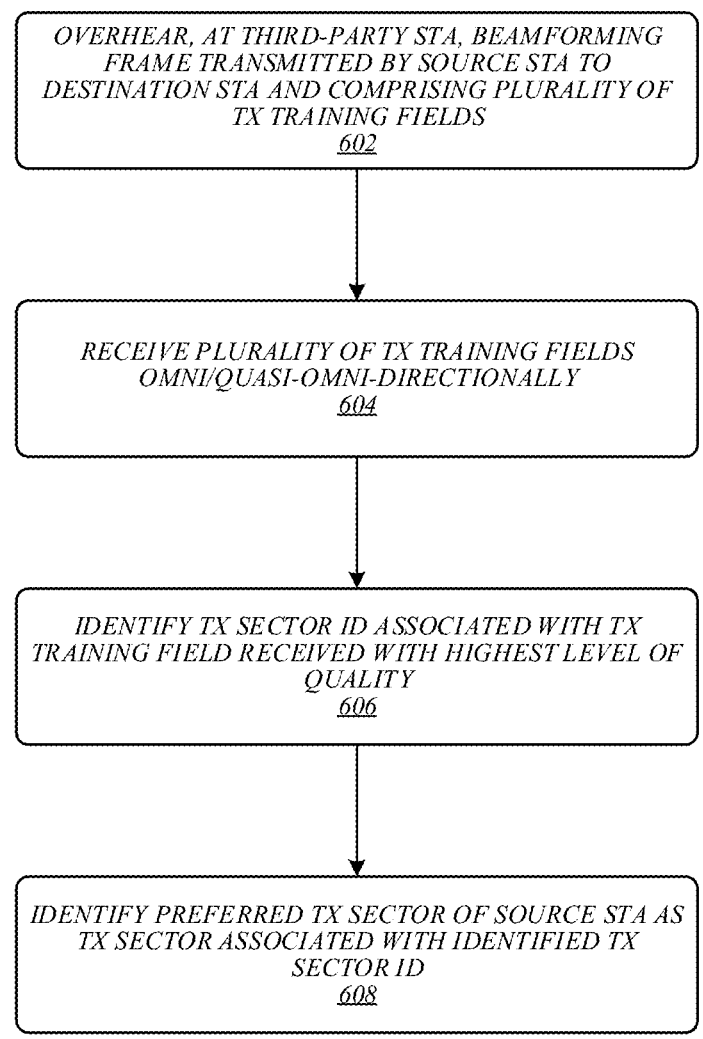
FIG. 6 illustrates an embodiment of a second logic flow.

FIG. 6 illustrates an example of a logic flow 600 that may be representative of operations that may be performed by a STA in conjunction with one or more of the disclosed techniques for passive beamforming training according to some embodiments. For example, logic flow 600 may be representative of operations that may be performed in various embodiments by STA 306 in operating environment 400 of FIG. 4. As shown in FIG. 6, a beamforming frame may be overheard at a third-party STA at 602, the beamforming frame transmitted by a source STA to a destination STA and comprising a plurality of transmit (TX) training fields. For example, in operating environment 400 of FIG. 4, STA 306 may overhear beamforming frame 420, which may be transmitted by STA 102 to STA 104 and may contain a plurality of training fields 428 that comprise TRN-T fields. At 604, the plurality of TX training fields may be received omni-directionally or quasi-omni-directionally. For example, in operating environment 400 of FIG. 4, training fields 428 may comprise TRN-T fields, and STA 306 may receive a plurality of training fields 428 omni-directionally or quasi-omni-directionally. At 606, a TX sector ID associated with a TX training field received with a highest level of quality may be identified. For example, in operating environment 400 of FIG. 4, training fields 428 may comprise TRN-T fields, and STA 306 may identify a TX sector ID associated with a training field 428 that it received with a highest level of quality. At 608, a preferred TX sector of the source STA may be identified as a TX sector that is associated with the TX sector ID identified at 606. For example, in operating environment 400 of FIG. 4, STA 306 may identify a preferred TX sector of STA 102—with respect to prospective reception by STA 306 from STA 102—as a TX sector associated with a TX sector ID identified at 606. The embodiments are not limited to these examples.

Figure 7:
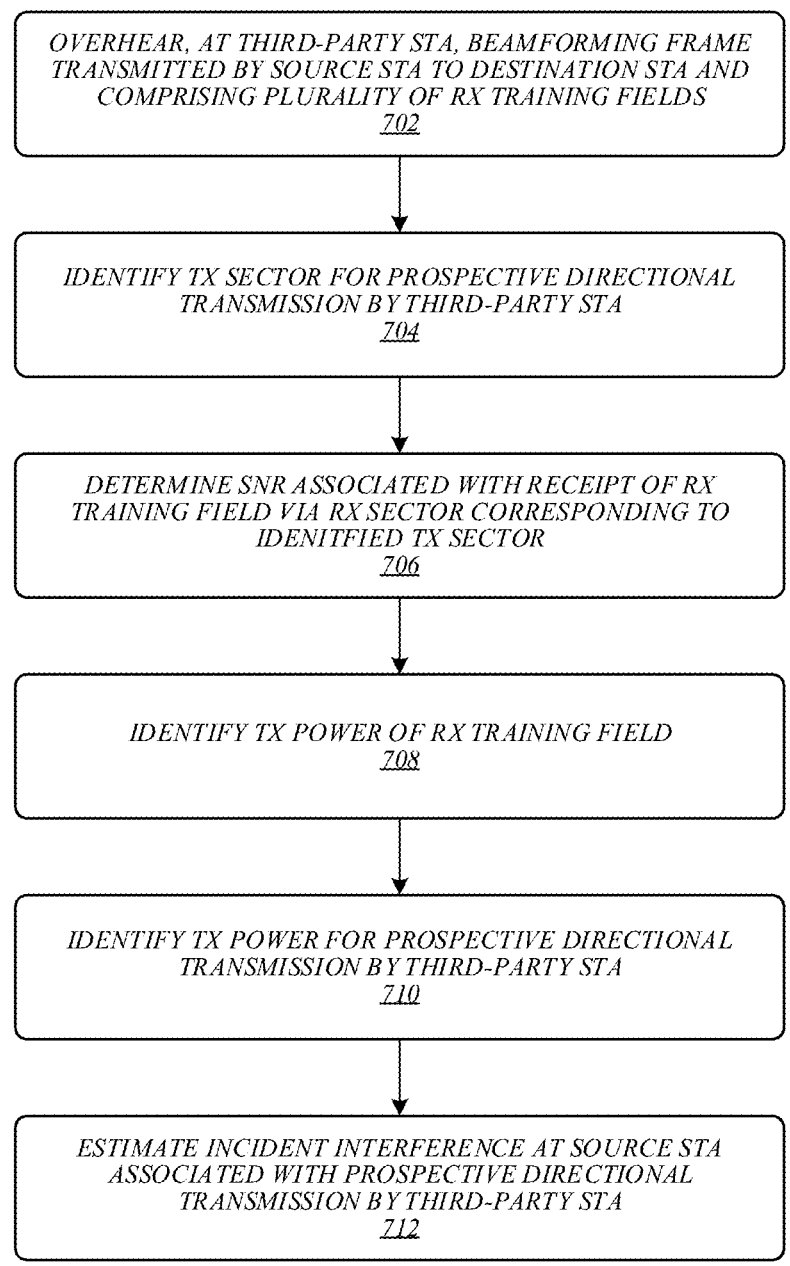
FIG. 7 illustrates an embodiment of a third logic flow.

FIG. 7 illustrates an example of a logic flow 700 that may be representative of operations that may be performed by a STA in conjunction with one or more of the disclosed techniques for passive beamforming training according to some embodiments. For example, logic flow 700 may be representative of operations that may be performed in various embodiments by STA 306 in operating environment 400 of FIG. 4. As shown in FIG. 7, a beamforming frame may be overheard at a third-party STA at 702, the beamforming frame transmitted by a source STA to a destination STA and comprising a plurality of RX training fields. For example, in operating environment 400 of FIG. 4, STA 306 may overhear beamforming frame 420, which may be transmitted by STA 102 to STA 104 and may contain a plurality of training fields 428 that comprise TRN-R fields. At 704, a TX sector for a prospective directional transmission by the third-party STA may be identified. For example, in operating environment 400 of FIG. 4, STA 306 may identify a TX sector for a prospective directional transmission to STA 480. At 706, an SNR associated with receipt of an RX training field via an RX sector corresponding to the identified TX sector may be determined. For example, in operating environment 400 of FIG. 4, training fields 428 may comprise TRN-R fields, and STA 306 may determine an SNR associated with receipt of a training field 428 via an RX sector corresponding to a TX sector identified at 704.

At 708, a TX power of the RX training field may be identified. For example, in operating environment 400 of FIG. 4, training fields 428 may comprise TRN-R fields, and STA 306 may identify a TX power of a training field 428 based on a transmit power parameter comprised in beamforming frame 420. At 710, a TX power for the prospective directional transmission by the third-party STA may be identified. For example, in operating environment 400 of FIG. 4, STA 306 may identify a TX power for the prospective directional transmission to STA 480. At 712, an incident interference at the source STA associated with the prospective directional transmission by the third-party STA may be estimated. For example, in operating environment 400 of FIG. 4, STA 306 may estimate an incident interference at STA 102 associated with prospective directional transmission by STA 306 to STA 480. In some embodiments, STA 306 may estimate this incident interference based on an SNR identified at 706 and on TX powers identified at 708 and 710. The embodiments are not limited to these examples.

Figure 8:
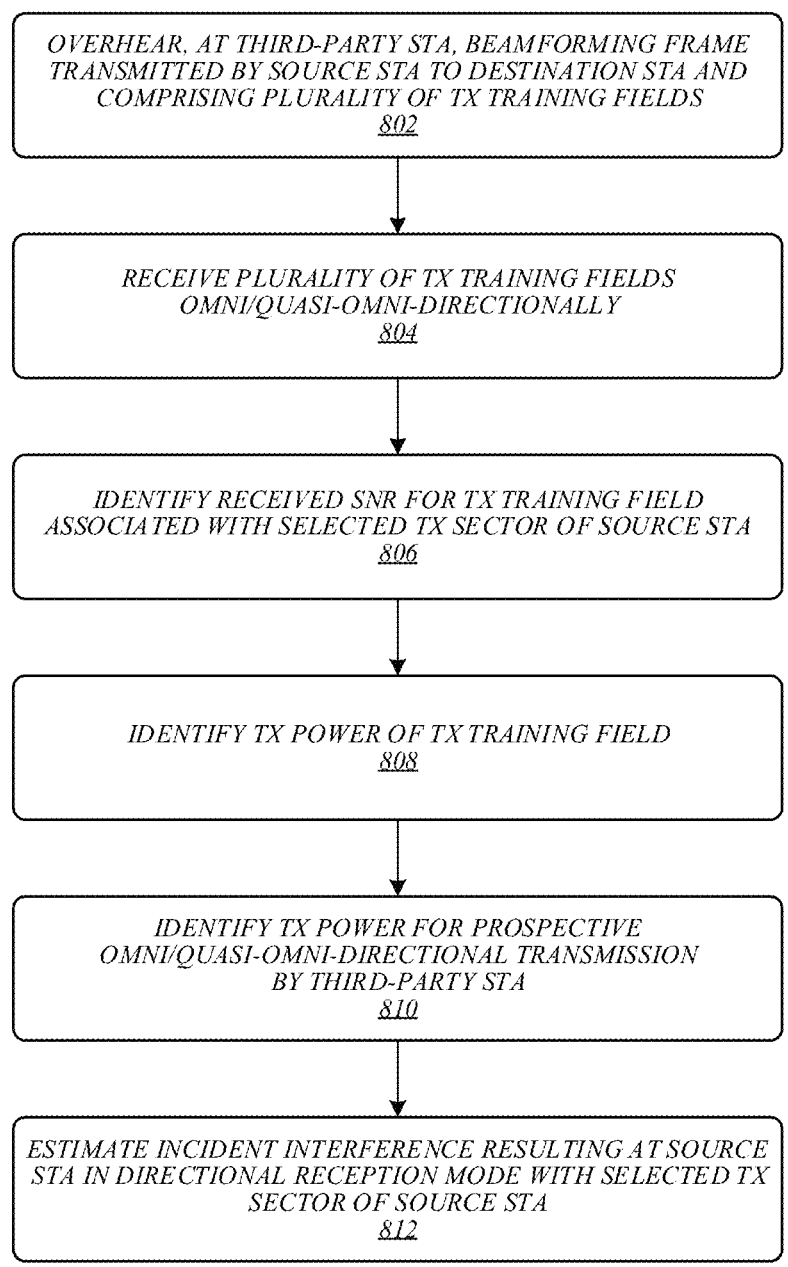
FIG. 8 illustrates an embodiment of a fourth logic flow.

FIG. 8 illustrates an example of a logic flow 800 that may be representative of operations that may be performed by a STA in conjunction with one or more of the disclosed techniques for passive beamforming training according to various embodiments. For example, logic flow 800 may be representative of operations that may be performed in some embodiments by STA 306 in operating environment 400 of FIG. 4. As shown in FIG. 8, a beamforming frame may be overheard at a third-party STA at 802, the beamforming frame transmitted by a source STA to a destination STA and comprising a plurality of TX training fields. For example, in operating environment 400 of FIG. 4, STA 306 may overhear beamforming frame 420, which may be transmitted by STA 102 to STA 104 and may contain a plurality of training fields 428 that comprise TRN-T fields. At 804, the plurality of TX training fields may be received omni-directionally or quasi-omni-directionally. For example, in operating environment 400 of FIG. 4, training fields 428 may comprise TRN-T fields, and STA 306 may receive a plurality of training fields 428 omni-directionally or quasi-omni-directionally. At 606, a received SNR may be identified for a TX training field associated with a selected TX sector of the source STA. For example, in operating environment 400 of FIG. 4, training fields 428 may comprise TRN-T fields, and STA 306 may identify a received SNR for a training field 428 associated with a selected TX sector of STA 102.

At 808, a TX power of the TX training field may be identified. For example, in operating environment 400 of FIG. 4, training fields 428 may comprise TRN-T fields, and STA 306 may identify a TX power of a training field 428 based on a transmit power parameter comprised in beamforming frame 420. At 810, a TX power for a prospective omni-directional or quasi-omni-directional transmission by the third-party STA may be identified. For example, in operating environment 400 of FIG. 4, STA 306 may identify a TX power for a prospective omni-directional or quasi-omni-directional transmission to STA 480. At 812, an incident interference resulting at the source STA in directional reception mode with the selected TX sector of the source STA may be estimated. For example, in operating environment 400 of FIG. 4, STA 306 may estimate an interference that will be incident upon STA 102 if the selected TX sector of STA 102 is active during the prospective omni-directional or quasi-omni-directional transmission from STA 306 to STA 480. In various embodiments, STA 306 may estimate this incident interference based on an SNR identified at 806 and on TX powers identified at 808 and 810. The embodiments are not limited to these examples.

Figure 9:
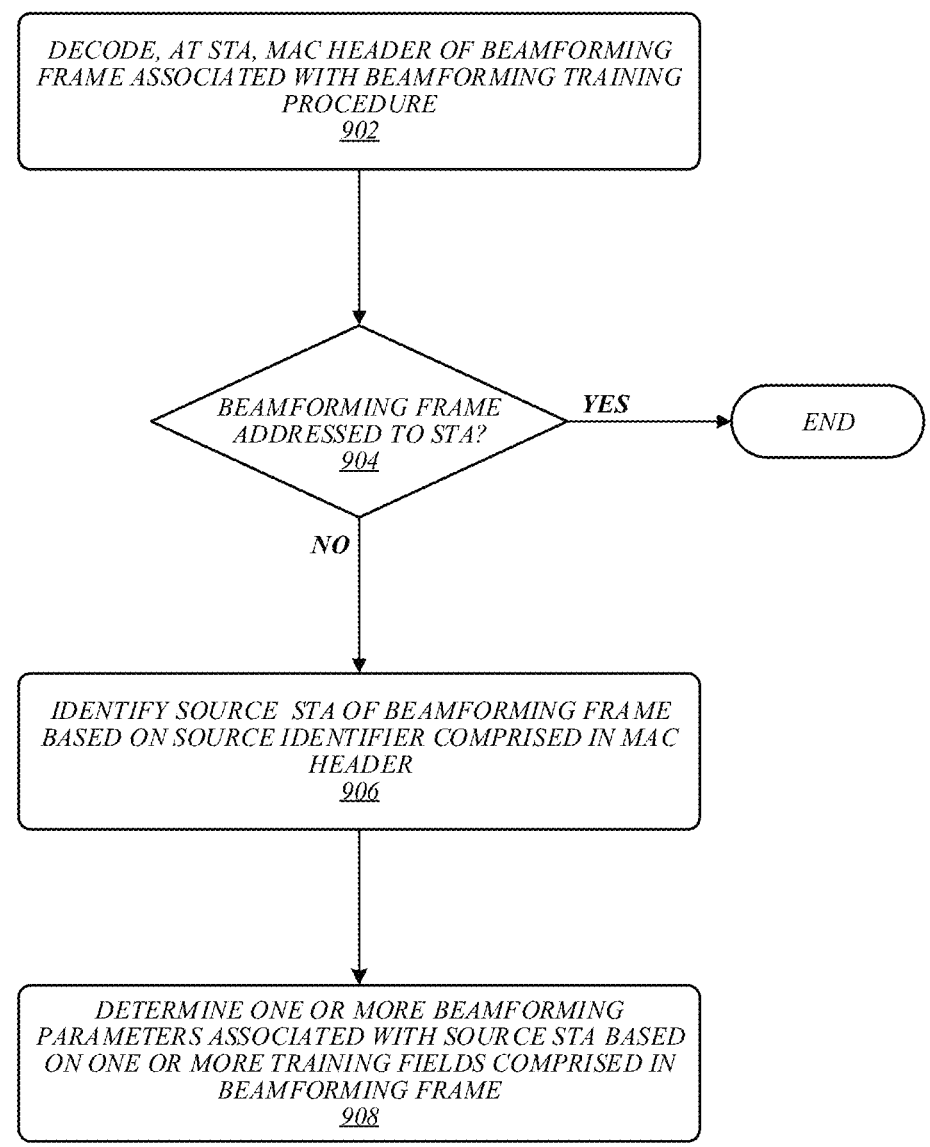
FIG. 9 illustrates an embodiment of a fifth logic flow.

FIG. 9 illustrates an example of a logic flow 900 that may be representative of operations that may be performed by a STA in conjunction with one or more of the disclosed techniques for passive beamforming training according to some embodiments. For example, logic flow 900 may be representative of operations that may be performed in various embodiments by STA 306 in operating environment 400 of FIG. 4. As shown in FIG. 9, a MAC header of a beamforming frame associated with a beamforming training procedure may be decoded at a STA at 902. For example, in operating environment 400 of FIG. 4, STA 306 may decode the MAC header 422 of beamforming frame 420.

At 904, it may be determined whether the beamforming frame is addressed to the STA. For example, in operating environment 400 of FIG. 4, STA 306 may determine whether beamforming frame 420 is addressed to STA 306 based on whether destination identifier 426 comprises a MAC address matching a MAC address of STA 306. If it is determined at 904 that the beamforming frame is addressed to the STA—which, in some embodiments, may indicate that the beamforming frame is associated with a beamforming training procedure in which the STA is an active participant such as an initiator or a responder—logic flow 900 may end.

If it is determined at 904 that the beamforming frame is not addressed to the STA, flow may proceed to 906. At 906, a source STA of the beamforming frame may be identified based on a source identifier comprised in the MAC header. For example, in operating environment 400 of FIG. 4, STA 306 may identify STA 102 as the source STA of beamforming frame 420 based on source identifier 424. At 908, one or more beamforming parameters associated with the source STA may be determined based on one or more training fields comprised in the beamforming frame. For example, in operating environment 400 of FIG. 4, STA 306 may determine one or more beamforming parameters 430 that are associated with STA 102 based on one or more training fields 428 comprised in beamforming frame 420. The embodiments are not limited to these examples.

In some embodiments, one or more of the disclosed techniques for passive beamforming training may be implemented fully or partially in software and/or firmware. In various embodiments, such software and/or firmware may take the form of instructions contained in or on a non-transitory computer-readable storage medium. In some embodiments, such instructions may be read and executed by one or more processors to enable performance of operations described herein. Such instructions may comprise any suitable form, such as—but not limited to—source code, compiled code, interpreted code, executable code, static code, dynamic code, and the like. Such a computer-readable medium may include any tangible non-transitory medium for storing information in a form readable by one or more computers, such as—but not limited to—read only memory (ROM), random access memory (RAM), magnetic disk storage media, optical storage media, a flash memory, etc.

Figure 10:
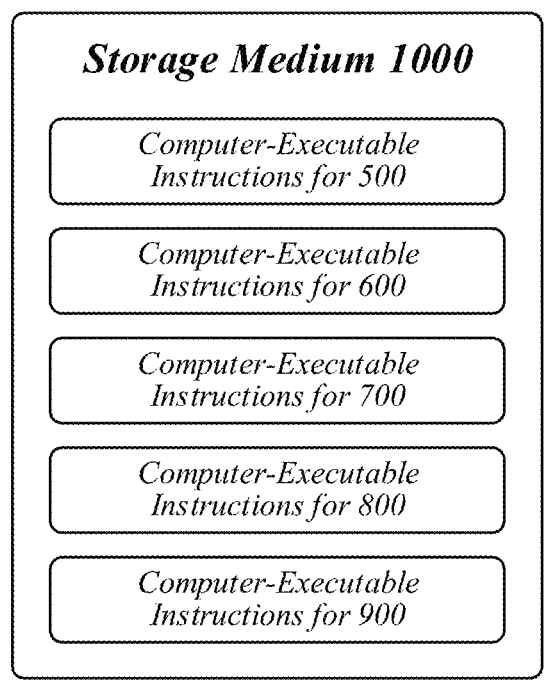
FIG. 10 illustrates an embodiment of a storage medium.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement one or more of logic flow 500 of FIG. 5, logic flow 600 of FIG. 6, logic flow 700 of FIG. 7, logic flow 800 of FIG. 8, and logic flow 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
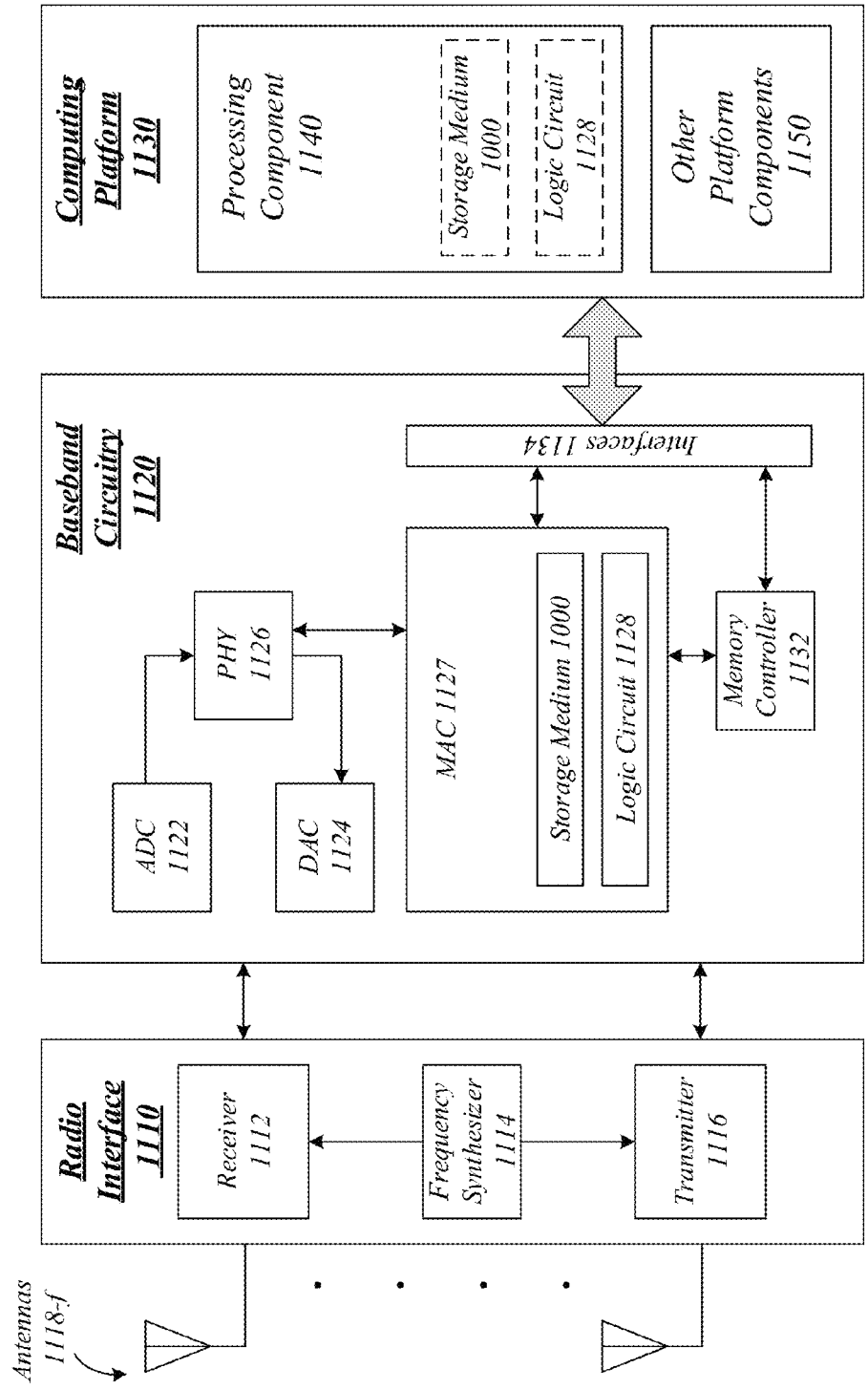
FIG. 11 illustrates an embodiment of a device.

FIG. 11 illustrates an embodiment of a communications device 1100 that may implement one or more of STAs 102, 104, 306 and 480, logic flow 500 of FIG. 5, logic flow 600 of FIG. 6, logic flow 700 of FIG. 7, logic flow 800 of FIG. 8, logic flow 900 of FIG. 9, and storage medium 1000 of FIG. 10. In various embodiments, device 1100 may comprise a logic circuit 1128. The logic circuit 1128 may include physical circuits to perform operations described for one or more of STAs 102, 104, 306 and 480, logic flow 500 of FIG. 5, logic flow 600 of FIG. 6, logic flow 700 of FIG. 7, logic flow 800 of FIG. 8, and logic flow 900 of FIG. 9, for example. As shown in FIG. 11, device 1100 may include a radio interface 1110, baseband circuitry 1120, and computing platform 1130, although the embodiments are not limited to this configuration.

The device 1100 may implement some or all of the structure and/or operations for one or more of STAs 102, 104, 306 and 480, logic flow 500 of FIG. 5, logic flow 600 of FIG. 6, logic flow 700 of FIG. 7, logic flow 800 of FIG. 8, logic flow 900 of FIG. 9, storage medium 1000 of FIG. 10, and logic circuit 1128 in a single computing entity, such as entirely within a single device. Alternatively, the device 1100 may distribute portions of the structure and/or operations for one or more of STAs 102, 104, 306 and 480, logic flow 500 of FIG. 5, logic flow 600 of FIG. 6, logic flow 700 of FIG. 7, logic flow 800 of FIG. 8, logic flow 900 of FIG. 9, storage medium 1000 of FIG. 10, and logic circuit 1128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1110 may include, for example, a receiver 1112, a frequency synthesizer 1114, and/or a transmitter 1116. Radio interface 1110 may include bias controls, a crystal oscillator and/or one or more antennas 1118-f. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a medium access control (MAC) processing circuit 1127 for MAC/data link layer processing. Baseband circuitry 1120 may include a memory controller 1132 for communicating with MAC processing circuit 1127 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames. Alternatively or in addition, MAC processing circuit 1127 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for one or more of STAs 102, 104, 306 and 480, logic flow 500 of FIG. 5, logic flow 600 of FIG. 6, logic flow 700 of FIG. 7, logic flow 800 of FIG. 8, logic flow 900 of FIG. 9, storage medium 1000 of FIG. 10, and logic circuit 1128 using the processing component 1140. The processing component 1140 (and/or PHY 1126 and/or MAC 1127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 12:
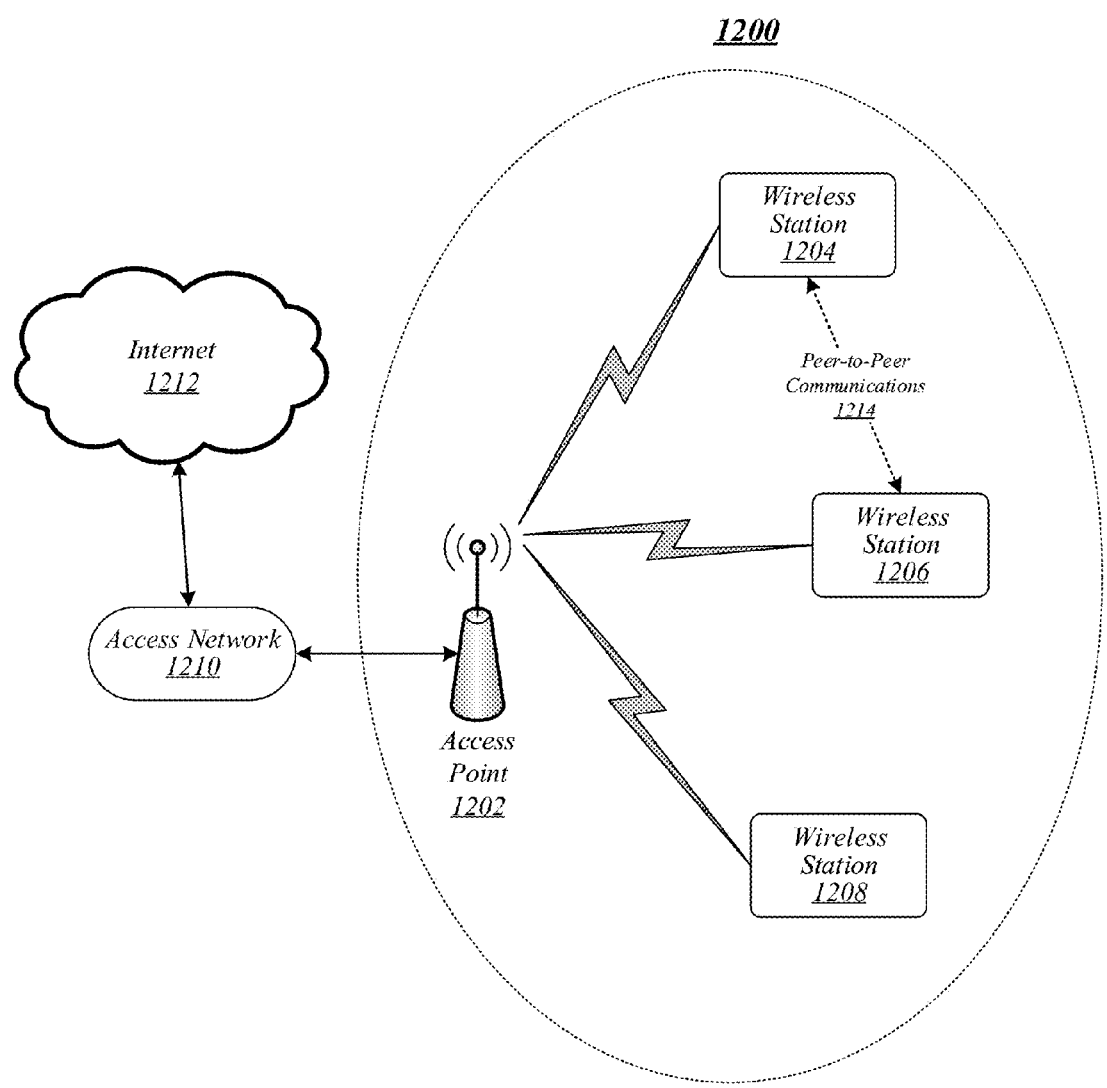
FIG. 12 illustrates an embodiment of a wireless network.

FIG. 12 illustrates an embodiment of a wireless network 1200. As shown in FIG. 12, wireless network comprises an access point 1202 and wireless stations 1204, 1206, and 1208. In various embodiments, wireless network 1200 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1200 may comprise another type of wireless network, and/or may implement other wireless communications standards. In various embodiments, for example, wireless network 1200 may comprise a WWAN or WPAN rather than a WLAN. The embodiments are not limited to this example.

In some embodiments, wireless network 1200 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1204, 1206, and 1208 may communicate with access point 1202 in order to obtain connectivity to one or more external data networks. In some embodiments, for example, wireless stations 1204, 1206, and 1208 may connect to the Internet 1212 via access point 1202 and access network 1210. In various embodiments, access network 1210 may comprise a private network that provides subscription-based Internet-connectivity, such as an Internet Service Provider (ISP) network. The embodiments are not limited to this example.

In various embodiments, two or more of wireless stations 1204, 1206, and 1208 may communicate with each other directly by exchanging peer-to-peer communications. For example, in the example of FIG. 12, wireless stations 1204 and 1206 communicate with each other directly by exchanging peer-to-peer communications 1214. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication apparatus, comprising at least one memory, and logic to implement a station (STA), at least a portion of the logic comprised in circuitry coupled to the at least one memory, the logic to decode a medium access control (MAC) header of a beamforming frame associated with a beamforming training procedure, determine whether the beamforming frame is addressed to the STA, and in response to a determination that the beamforming frame is not addressed to the STA identify a second STA based on a source identifier comprised in the MAC header, the second STA to comprise a source STA of the beamforming frame, and determine one or more beamforming parameters associated with the second STA based on one or more training fields comprised in the beamforming frame.

Example 2 is the wireless communication apparatus of Example 1, the beamforming frame to include a field comprising a value to indicate a transmit power of the beamforming frame.

Example 3 is the wireless communication apparatus of Example 2, the value to be comprised in a beam refinement protocol (BRP) Request field of the beamforming frame.

Example 4 is the wireless communication apparatus of Example 1, the one or more beamforming parameters to include a receive sector identifier for a receive sector of the STA, the receive sector to comprise a preferred receive sector of the STA with respect to prospective reception by the STA from the second STA.

Example 5 is the wireless communication apparatus of Example 1, the one or more beamforming parameters to include a transmit sector identifier for a transmit sector of the second STA, the transmit sector to comprise a preferred transmit sector of the second STA with respect to prospective reception by the STA from the second STA.

Example 6 is the wireless communication apparatus of Example 1, the one or more beamforming parameters to include an estimated incident interference at the second STA associated with a prospective transmission of the STA according to a omni-directional or quasi-omni-directional transmission mode.

Example 7 is the wireless communication apparatus of Example 1, the one or more beamforming parameters to include an estimated incident interference at the second STA associated with a prospective transmission of the STA towards a transmit sector of the STA according to a directional transmission mode.

Example 8 is the wireless communication apparatus of Example 1, the beamforming training procedure to comprise a beam refinement procedure.

Example 9 is the wireless communication apparatus of Example 1, the beamforming frame to comprise a beam refinement frame.

Example 10 is the wireless communication apparatus of Example 9, the beamforming frame to comprise a beam refinement protocol (BRP)-TX frame.

Example 11 is the wireless communication apparatus of Example 10, the one or more training fields to comprise transmit training (TRN-T) fields.

Example 12 is the wireless communication apparatus of Example 9, the beamforming frame to comprise a beam refinement protocol (BRP)-RX frame.

Example 13 is the wireless communication apparatus of Example 12, the one or more training fields to comprise receive training (TRN-R) fields.

Example 14 is the wireless communication apparatus of Example 1, the logic to determine one or more beamforming parameters associated with a third STA based on one or more training fields comprised in a second beamforming frame associated with the beamforming training procedure.

Example 15 is the wireless communication apparatus of Example 1, the source identifier to comprise a MAC address of the second STA.

Example 16 is the wireless communication apparatus of Example 1, the beamforming frame associated with a beam combining subphase of the beamforming training procedure.

Example 17 is the wireless communication apparatus of Example 16, the beam combining subphase to comprise an initiator beam combining (I-BC) subphase or a responder beam combining (R-BC) subphase.

Example 18 is the wireless communication apparatus of Example 16, the logic to determine a plurality of signal quality metrics associated with a transmit sector of the second STA based on a training field associated with the transmit sector of the second STA, each of the plurality of signal quality metrics to correspond to a respective one of a plurality of receive sectors of the STA.

Example 19 is the wireless communication apparatus of Example 18, each of the plurality of signal quality metrics to comprise a signal-to-noise ratio (SNR).

Example 20 is the wireless communication apparatus of Example 1, the source STA to comprise an initiator STA of the beamforming training procedure.

Example 21 is the wireless communication apparatus of Example 1, the source STA to comprise a responder STA of the beamforming training procedure.

Example 22 is a system, comprising a wireless communication apparatus according to any of Examples 1 to 21, at least one radio frequency (RF) transceiver, and at least one processor.

Example 23 is the system of Example 22, comprising at least one RF antenna.

Example 24 is the system of any of Examples 22 to 23, comprising a touchscreen display.

Example 25 is at least one non-transitory computer-readable storage medium comprising a set of wireless communication instructions that, in response to being executed at a station (STA), cause the STA to decode a medium access control (MAC) header of a beamforming frame associated with a beamforming training procedure, determine whether the beamforming frame is addressed to the STA, and in response to a determination that the beamforming frame is not addressed to the STA identify a second STA based on a source identifier comprised in the MAC header, the second STA to comprise a source STA of the beamforming frame, and determine one or more beamforming parameters associated with the second STA based on one or more training fields comprised in the beamforming frame.

Example 26 is the at least one non-transitory computer-readable storage medium of Example 25, the beamforming frame to include a field comprising a value to indicate a transmit power of the beamforming frame.

Example 27 is the at least one non-transitory computer-readable storage medium of Example 26, the value to be comprised in a beam refinement protocol (BRP) Request field of the beamforming frame.

Example 28 is the at least one non-transitory computer-readable storage medium of Example 25, the one or more beamforming parameters to include a receive sector identifier for a receive sector of the STA, the receive sector to comprise a preferred receive sector of the STA with respect to prospective reception by the STA from the second STA.

Example 29 is the at least one non-transitory computer-readable storage medium of Example 25, the one or more beamforming parameters to include a transmit sector identifier for a transmit sector of the second STA, the transmit sector to comprise a preferred transmit sector of the second STA with respect to prospective reception by the STA from the second STA.

Example 30 is the at least one non-transitory computer-readable storage medium of Example 25, the one or more beamforming parameters to include an estimated incident interference at the second STA associated with a prospective transmission of the STA according to a omni-directional or quasi-omni-directional transmission mode.

Example 31 is the at least one non-transitory computer-readable storage medium of Example 25, the one or more beamforming parameters to include an estimated incident interference at the second STA associated with a prospective transmission of the STA towards a transmit sector of the STA according to a directional transmission mode.

Example 32 is the at least one non-transitory computer-readable storage medium of Example 25, the beamforming training procedure to comprise a beam refinement procedure.

Example 33 is the at least one non-transitory computer-readable storage medium of Example 25, the beamforming frame to comprise a beam refinement frame.

Example 34 is the at least one non-transitory computer-readable storage medium of Example 33, the beamforming frame to comprise a beam refinement protocol (BRP)-TX frame.

Example 35 is the at least one non-transitory computer-readable storage medium of Example 34, the one or more training fields to comprise transmit training (TRN-T) fields.

Example 36 is the at least one non-transitory computer-readable storage medium of Example 33, the beamforming frame to comprise a beam refinement protocol (BRP)-RX frame.

Example 37 is the at least one non-transitory computer-readable storage medium of Example 36, the one or more training fields to comprise receive training (TRN-R) fields.

Example 38 is the at least one non-transitory computer-readable storage medium of Example 25, comprising wireless communication instructions that, in response to being executed at the STA, cause the STA to determine one or more beamforming parameters associated with a third STA based on one or more training fields comprised in a second beamforming frame associated with the beamforming training procedure.

Example 39 is the at least one non-transitory computer-readable storage medium of Example 25, the source identifier to comprise a MAC address of the second STA.

Example 40 is the at least one non-transitory computer-readable storage medium of Example 25, the beamforming frame associated with a beam combining subphase of the beamforming training procedure.

Example 41 is the at least one non-transitory computer-readable storage medium of Example 40, the beam combining subphase to comprise an initiator beam combining (I-BC) subphase or a responder beam combining (R-BC) subphase.

Example 42 is the at least one non-transitory computer-readable storage medium of Example 40, comprising wireless communication instructions that, in response to being executed at the STA, cause the STA to determine a plurality of signal quality metrics associated with a transmit sector of the second STA based on a training field associated with the transmit sector of the second STA, each of the plurality of signal quality metrics to correspond to a respective one of a plurality of receive sectors of the STA.

Example 43 is the at least one non-transitory computer-readable storage medium of Example 42, each of the plurality of signal quality metrics to comprise a signal-to-noise ratio (SNR).

Example 44 is the at least one non-transitory computer-readable storage medium of Example 25, the source STA to comprise an initiator STA of the beamforming training procedure.

Example 45 is the at least one non-transitory computer-readable storage medium of Example 25, the source STA to comprise a responder STA of the beamforming training procedure.

Example 46 is a wireless communication method, comprising decoding, by circuitry of a station (STA), a medium access control (MAC) header of a beamforming frame associated with a beamforming training procedure, determining whether the beamforming frame is addressed to the STA, and in response to a determination that the beamforming frame is not addressed to the STA identifying a second STA based on a source identifier comprised in the MAC header, the second STA to comprise a source STA of the beamforming frame, and determining one or more beamforming parameters associated with the second STA based on one or more training fields comprised in the beamforming frame.

Example 47 is the wireless communication method of Example 46, the beamforming frame to include a field comprising a value to indicate a transmit power of the beamforming frame.

Example 48 is the wireless communication method of Example 47, the value to be comprised in a beam refinement protocol (BRP) Request field of the beamforming frame.

Example 49 is the wireless communication method of Example 46, the one or more beamforming parameters to include a receive sector identifier for a receive sector of the STA, the receive sector to comprise a preferred receive sector of the STA with respect to prospective reception by the STA from the second STA.

Example 50 is the wireless communication method of Example 46, the one or more beamforming parameters to include a transmit sector identifier for a transmit sector of the second STA, the transmit sector to comprise a preferred transmit sector of the second STA with respect to prospective reception by the STA from the second STA.

Example 51 is the wireless communication method of Example 46, the one or more beamforming parameters to include an estimated incident interference at the second STA associated with a prospective transmission of the STA according to a omni-directional or quasi-omni-directional transmission mode.

Example 52 is the wireless communication method of Example 46, the one or more beamforming parameters to include an estimated incident interference at the second STA associated with a prospective transmission of the STA towards a transmit sector of the STA according to a directional transmission mode.

Example 53 is the wireless communication method of Example 46, the beamforming training procedure to comprise a beam refinement procedure.

Example 54 is the wireless communication method of Example 46, the beamforming frame to comprise a beam refinement frame.

Example 55 is the wireless communication method of Example 54, the beamforming frame to comprise a beam refinement protocol (BRP)-TX frame.

Example 56 is the wireless communication method of Example 55, the one or more training fields to comprise transmit training (TRN-T) fields.

Example 57 is the wireless communication method of Example 54, the beamforming frame to comprise a beam refinement protocol (BRP)-RX frame.

Example 58 is the wireless communication method of Example 57, the one or more training fields to comprise receive training (TRN-R) fields.

Example 59 is the wireless communication method of Example 46, comprising determining one or more beamforming parameters associated with a third STA based on one or more training fields comprised in a second beamforming frame associated with the beamforming training procedure.

Example 60 is the wireless communication method of Example 46, the source identifier to comprise a MAC address of the second STA.

Example 61 is the wireless communication method of Example 46, the beamforming frame associated with a beam combining subphase of the beamforming training procedure.

Example 62 is the wireless communication method of Example 61, the beam combining subphase to comprise an initiator beam combining (I-BC) subphase or a responder beam combining (R-BC) subphase.

Example 63 is the wireless communication method of Example 61, comprising determining a plurality of signal quality metrics associated with a transmit sector of the second STA based on a training field associated with the transmit sector of the second STA, each of the plurality of signal quality metrics to correspond to a respective one of a plurality of receive sectors of the STA.

Example 64 is the wireless communication method of Example 63, each of the plurality of signal quality metrics to comprise a signal-to-noise ratio (SNR).

Example 65 is the wireless communication method of Example 46, the source STA to comprise an initiator STA of the beamforming training procedure.

Example 66 is the wireless communication method of Example 46, the source STA to comprise a responder STA of the beamforming training procedure.

Example 67 is at least one non-transitory computer-readable storage medium comprising a set of instructions that, in response to being executed on a computing device, cause the computing device to perform a wireless communication method according to any of Examples 46 to 66.

Example 68 is an apparatus, comprising means for performing a wireless communication method according to any of Examples 46 to 66.

Example 69 is a system, comprising the apparatus of Example 68, at least one radio frequency (RF) transceiver, and at least one processor.

Example 70 is the system of Example 69, comprising at least one RF antenna.

Example 71 is the system of any of Examples 68 to 69, comprising a touchscreen display.

Example 72 is a wireless communication apparatus, comprising means for decoding, at a station (STA), a medium access control (MAC) header of a beamforming frame associated with a beamforming training procedure, means for determining whether the beamforming frame is addressed to the STA, and means for, in response to a determination that the beamforming frame is not addressed to the STA identifying a second STA based on a source identifier comprised in the MAC header, the second STA to comprise a source STA of the beamforming frame, and determining one or more beamforming parameters associated with the second STA based on one or more training fields comprised in the beamforming frame.

Example 73 is the wireless communication apparatus of Example 72, the beamforming frame to include a field comprising a value to indicate a transmit power of the beamforming frame.

Example 74 is the wireless communication apparatus of Example 73, the value to be comprised in a beam refinement protocol (BRP) Request field of the beamforming frame.

Example 75 is the wireless communication apparatus of Example 72, the one or more beamforming parameters to include a receive sector identifier for a receive sector of the STA, the receive sector to comprise a preferred receive sector of the STA with respect to prospective reception by the STA from the second STA.

Example 76 is the wireless communication apparatus of Example 72, the one or more beamforming parameters to include a transmit sector identifier for a transmit sector of the second STA, the transmit sector to comprise a preferred transmit sector of the second STA with respect to prospective reception by the STA from the second STA.

Example 77 is the wireless communication apparatus of Example 72, the one or more beamforming parameters to include an estimated incident interference at the second STA associated with a prospective transmission of the STA according to a omni-directional or quasi-omni-directional transmission mode.

Example 78 is the wireless communication apparatus of Example 72, the one or more beamforming parameters to include an estimated incident interference at the second STA associated with a prospective transmission of the STA towards a transmit sector of the STA according to a directional transmission mode.

Example 79 is the wireless communication apparatus of Example 72, the beamforming training procedure to comprise a beam refinement procedure.

Example 80 is the wireless communication apparatus of Example 72, the beamforming frame to comprise a beam refinement frame.

Example 81 is the wireless communication apparatus of Example 80, the beamforming frame to comprise a beam refinement protocol (BRP)-TX frame.

Example 82 is the wireless communication apparatus of Example 81, the one or more training fields to comprise transmit training (TRN-T) fields.

Example 83 is the wireless communication apparatus of Example 80, the beamforming frame to comprise a beam refinement protocol (BRP)-RX frame.

Example 84 is the wireless communication apparatus of Example 83, the one or more training fields to comprise receive training (TRN-R) fields.

Example 85 is the wireless communication apparatus of Example 72, comprising means for determining one or more beamforming parameters associated with a third STA based on one or more training fields comprised in a second beamforming frame associated with the beamforming training procedure.

Example 86 is the wireless communication apparatus of Example 72, the source identifier to comprise a MAC address of the second STA.

Example 87 is the wireless communication apparatus of Example 72, the beamforming frame associated with a beam combining subphase of the beamforming training procedure.

Example 88 is the wireless communication apparatus of Example 87, the beam combining subphase to comprise an initiator beam combining (I-BC) subphase or a responder beam combining (R-BC) subphase.

Example 89 is the wireless communication apparatus of Example 87, comprising means for determining a plurality of signal quality metrics associated with a transmit sector of the second STA based on a training field associated with the transmit sector of the second STA, each of the plurality of signal quality metrics to correspond to a respective one of a plurality of receive sectors of the STA.

Example 90 is the wireless communication apparatus of Example 89, each of the plurality of signal quality metrics to comprise a signal-to-noise ratio (SNR).

Example 91 is the wireless communication apparatus of Example 72, the source STA to comprise an initiator STA of the beamforming training procedure.

Example 92 is the wireless communication apparatus of Example 72, the source STA to comprise a responder STA of the beamforming training procedure.

Example 93 is a system, comprising a wireless communication apparatus according to any of Examples 72 to 92, at least one radio frequency (RF) transceiver, and at least one processor.

Example 94 is the system of Example 93, comprising at least one RF antenna.

Example 95 is the system of any of Examples 93 to 94, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic to implement a station (STA), at least a portion of the logic comprised in circuitry coupled to the at least one memory, the logic to:
      decode a medium access control (MAC) header of a beamforming frame associated with a beamforming training procedure, the beamforming frame comprising a beam refinement protocol (BRP) field comprising a value to indicate a transmit power of the beamforming frame;
      determine whether the beamforming frame is addressed to the STA; and
      in response to a determination that the beamforming frame is not addressed to the STA:
         determine to perform passive beamforming training;
         identify a second STA based on a source identifier comprised in the MAC header, the second STA to comprise a source STA of the beamforming frame; and
         perform passive beamforming training comprising determining one or more beamforming parameters associated with the second STA based on one or more training fields comprised in the beamforming frame.

2. The apparatus of claim 1, the one or more beamforming parameters to include a receive sector identifier for a receive sector of the STA, the receive sector to comprise a preferred receive sector of the STA with respect to prospective reception by the STA from the second STA.

3. The apparatus of claim 1, the one or more beamforming parameters to include a transmit sector identifier for a transmit sector of the second STA, the transmit sector to comprise a preferred transmit sector of the second STA with respect to prospective reception by the STA from the second STA.

4. The apparatus of claim 1, the one or more beamforming parameters to include an estimated incident interference at the second STA associated with a prospective transmission of the STA according to a omni-directional or quasi-omni-directional transmission mode.

5. The apparatus of claim 1, the one or more beamforming parameters to include an estimated incident interference at the second STA associated with a prospective transmission of the STA towards a transmit sector of the STA according to a directional transmission mode.

6. The apparatus of claim 1, the beamforming frame to comprise a beam refinement frame.

7. The apparatus of claim 1, the logic to determine one or more beamforming parameters associated with a third STA based on one or more training fields comprised in a second beamforming frame associated with the beamforming training procedure.

8. The apparatus of claim 1, comprising:
   at least one radio frequency (RF) transceiver; and
   at least one processor.

9. At least one non-transitory computer-readable storage medium comprising a set of instructions that, in response to being executed at a station (STA), cause the STA to:
   decode a medium access control (MAC) header of a beamforming frame associated with a beamforming training procedure, the beamforming frame comprising a beam refinement protocol (BRP) field comprising a value to indicate a transmit power of the beamforming frame;

determine that the beamforming frame is not addressed to the STA;

in response to a determination the beamforming frame is not addressed to the STA:

determine to perform passive beamforming training;

identify a second STA based on a source identifier comprised in the MAC header, the second STA to comprise a source STA of the beamforming frame; and perform passive beamforming training comprising determining one or more beamforming parameters associated with the second STA based on one or more training fields comprised in the beamforming frame and the value indicating the transmit power of the beamforming frame.

10. The at least one non-transitory computer-readable storage medium of claim 9, the one or more beamforming parameters to include a receive sector identifier for a receive sector of the STA, the receive sector to comprise a preferred receive sector of the STA with respect to prospective reception by the STA from the second STA.

11. The at least one non-transitory computer-readable storage medium of claim 9, the one or more beamforming parameters to include a transmit sector identifier for a transmit sector of the second STA, the transmit sector to comprise a preferred transmit sector of the second STA with respect to prospective reception by the STA from the second STA.

12. The at least one non-transitory computer-readable storage medium of claim 9, the one or more beamforming parameters to include an estimated incident interference at the second STA associated with a prospective transmission of the STA according to a omni-directional or quasi-omni-directional transmission mode.

13. The at least one non-transitory computer-readable storage medium of claim 9, the one or more beamforming parameters to include an estimated incident interference at the second STA associated with a prospective transmission of the STA towards a transmit sector of the STA according to a directional transmission mode.

14. The at least one non-transitory computer-readable storage medium of claim 9, the beamforming frame to comprise a beam refinement frame.

15. The at least one non-transitory computer-readable storage medium of claim 9, comprising instructions that, in response to being executed at the STA, cause the STA to determine one or more beamforming parameters associated with a third STA based on one or more training fields comprised in a second beamforming frame associated with the beamforming training procedure.

16. A method, comprising:

decoding, by circuitry of a station (STA), a medium access control (MAC) header of a beamforming frame associated with a beamforming training procedure, the beamforming frame comprising a beam refinement protocol (BRP) field comprising a value to indicate a transmit power of the beamforming frame;

determining whether the beamforming frame is addressed to the STA; and in response to a determination that the beamforming frame is not addressed to the STA:

determining to perform passive beamforming training;

identifying a second STA based on a source identifier comprised in the MAC header, the second STA to comprise a source STA of the beamforming frame; and performing passive beamforming training comprising determining one or more beamforming parameters associated with the second STA based on one or more training fields comprised in the beamforming frame and the value indicating the transmit power of the beamforming frame.

17. The method of claim 16, the one or more beamforming parameters to include a receive sector identifier for a receive sector of the STA, the receive sector to comprise a preferred receive sector of the STA with respect to prospective reception by the STA from the second STA.

18. The method of claim 16, the one or more beamforming parameters to include a transmit sector identifier for a transmit sector of the second STA, the transmit sector to comprise a preferred transmit sector of the second STA with respect to prospective reception by the STA from the second STA.

19. The method of claim 16, the one or more beamforming parameters to include an estimated incident interference at the second STA associated with a prospective transmission of the STA according to a omni-directional or quasi-omni-directional transmission mode.

20. The method of claim 16, the one or more beamforming parameters to include an estimated incident interference at the second STA associated with a prospective transmission of the STA towards a transmit sector of the STA according to a directional transmission mode.

21. The method of claim 16, the beamforming frame to comprise a beam refinement frame.

22. The method of claim 16, comprising determining one or more beamforming parameters associated with a third STA based on one or more training fields comprised in a second beamforming frame associated with the beamforming training procedure.

* * * * *